(No Model.)

W. F. BRAUN.
AUTOMATIC WEIGHING MACHINE.

No. 593,455.

Patented Nov. 9, 1897.

(No Model.)  11 Sheets—Sheet 5.

W. F. BRAUN.
AUTOMATIC WEIGHING MACHINE.

No. 593,455.  Patented Nov. 9, 1897.

Fig. 5.

Witnesses
L. B. Middleton
C. S. Middleton

Inventor
William F. Braun
By Attorneys
Wallen Donaldson (No Model.) 11 Sheets—Sheet 7.

W. F. BRAUN.
AUTOMATIC WEIGHING MACHINE.

No. 593,455. Patented Nov. 9, 1897.

Witnesses
L. B. Middleton
C. S. Middleton

Inventor
William F. Braun
By
Attorneys
Wallern Donaldson & Co (No Model.) 11 Sheets—Sheet 8.

W. F. BRAUN.
AUTOMATIC WEIGHING MACHINE.

No. 593,455. Patented Nov. 9, 1897.

Witnesses
L. B. Middleton
C. S. Middleton

Inventor
William F. Braun
By Attorneys
Walter Donaldson & Co.

THE NORRIS PETERS CO., PHOTO-LITHO., WASHINGTON, D. C.

(No Model.) 11 Sheets—Sheet 9.

W. F. BRAUN.
AUTOMATIC WEIGHING MACHINE.

No. 593,455. Patented Nov. 9, 1897.

Witnesses
J. B. Middleton
C. S. Middleton

Inventor
William F. Braun
By Attorneys
Wallen Donaldson & Co.

(No Model.) 11 Sheets—Sheet 11.
W. F. BRAUN.
AUTOMATIC WEIGHING MACHINE.

No. 593,455. Patented Nov. 9, 1897.

Fig. 18.

Attest
L. B. Middleton.
C. S. Middleton

Inventor
William F. Braun
by Walter Donaldson
Attys.

UNITED STATES PATENT OFFICE.

WILLIAM F. BRAUN, OF CHICAGO, ILLINOIS, ASSIGNOR TO JOHN E. SEARLES, OF NEW YORK, N. Y.

AUTOMATIC WEIGHING-MACHINE.

SPECIFICATION forming part of Letters Patent No. 593,455, dated November 9, 1897.

Application filed November 24, 1896. Serial No. 613,294. (No model.)

*To all whom it may concern:*

Be it known that I, WILLIAM F. BRAUN, a citizen of the United States, and a resident of Chicago, county of Cook, and State of Illinois, have invented certain new and useful Improvements in Automatic Weighing-Machines, of which the following is a full, clear, and exact description.

My invention is an automatic weighing-machine and belongs to that class in which a scale-beam is used and which is double-acting, having a receptacle at each end, so that on each movement of the beam a quantity of material will be weighed, the action going on continuously, one receptacle being filled as the other is being discharged.

In automatic weighing-machines having a shifting weight on the scale-beam accuracy in weighing out the desired amount of material cannot be attained by depending upon the impetus or momentum given to the beam by the weight of the falling column of material to carry it past the position of equilibrium and to cause the shifting weight to move to the falling end and thus cause the cutting off of the feed. In this action the weight by reason of its inertia does not begin to move until the beam has passed the balanced position and has inclined in the opposite direction, so that the feed will not be cut off when the beam is in equilibrium, but, on the contrary, it will continue to flow until the weight is set in motion, thus giving an inaccurate, irregular, and uncertain measure, resulting in overweight. In my machine I do not depend on the momentum of the beam to carry it from one position, past the balanced position, to the other in order to start the weight nor to a continuance of the full feed up to the time of cutting off, but I employ an outside power or force entirely independent of the momentum of the scale-beam and yet controlled as to its exact time of action by the beam when it reaches a balanced or predetermined position, said outside force or power acting to destroy the equilibrium of the beam when it reaches said predetermined position and to cause it to tip in the opposite direction, the inertia of the weight being overcome at the instant the predetermined position is reached. In connection with this balance-destroying means controlled by an outside power I employ a form of feeding device which as the beam approaches its balanced position will reduce the feed automatically and thus reduce the amount of material passing to the receptacle on the beam, so that when the horizontal position of the beam is reached the exact weight of material desired will have passed to the receptacle, at which time the feed is instantly cut off, and thus the accurate weight will be insured. This reduction of the feed to a very small quantity before the final cutting off is effected by reducing the size of the feeding-opening, so that the minimum quantity of material will pass through, without choking, however, and for this purpose automatic gates are employed to reduce the size of the feeding-opening and to keep it at this size until the balanced position of the beam is reached. A further control of the feeding-opening is effected by means of adjustable side walls, which the operator may set to suit the requirements of the material being weighed. It will be noticed that with the combination of these two features—namely, of the outside balance-destroying means, or the means for overcoming the inertia of the weight, and the gradual reduction of the feed to the smallest quantity due to the small size of the feeding-opening and to maintaining this opening without choking—I am enabled to bring the scale-beam to an exact state of equilibrium by reducing the feed, and then by destroying the equilibrium and overcoming the inertia of the weight by the outside power or force the movement of the beam is caused to be continued so that it will tip to the opposite position. I prefer to use as the outside force or power electricity, and the devices operated thereby will be energized when the beam reaches a predetermined position, which I prefer to be the balanced position. The feeding devices I also prefer to control by electricity, and, as will hereinafter appear, they are opened mechanically by means carried on the beam and are controlled as to their final closing by the electrical devices mentioned.

My invention includes many novel features and combinations of elements, hereinafter described, and specifically set forth in the claims.

The coffee or other material to be weighed is fed by a feeding-cap 4, preferably cast in one piece and having lateral spouts or branches 5, one on each side, the outer ends of which extend downwardly to direct the material to be weighed into the automatic feeding devices 6 7, each of which comprises a pair of movable gates 8 9 and adjustable walls 10 and 11. The feeding-gates meet each other at their lower ends and diverge from this point upwardly to form a pocket, and one gate of each pair has a solid curved plate carried on cross-pieces 17, while the corresponding part of the other gate is made up of a series of sliding fingers 12', set upon edge and arranged on a pair of cross-bars 12, extending between the gate-arms 13. These gate-arms curve upwardly and laterally and are pivoted to the cast feeding-cap at the points 14, where rock-shafts are journaled carrying said arms. The arms $13^\times$ of the solid feeding-gates likewise curve upwardly and inwardly, being carried on rock-shafts 15, journaled in the feeding-cap. The adjustable walls of the feeding devices consist of vertical portions fitting in between the feeding-gates to form the front and rear portions of the pockets of which the gates form the sides, and said adjustable walls have horizontal extensions 16, adapted to slide in guideways of brackets 18, secured to the cast feeding-spouts. The inner wall of the feeding-pocket is formed by a downwardly-extending portion of the cast spout. By means of these adjustable front and rear walls of the pockets the size of the feeding pockets or spouts can be regulated to suit the material or to change the rate of flow, as desired. The sliding fingers of the feeding-gate have slots in both their ends by which they may move freely on the cross-pins for a purpose hereinafter described. These gates are movable to control the feed of the material, and they are controlled in turn by mechanical and electrical appliances now to be described.

The weight-beam or balance-scale beam carries the receptacles into which the material to be weighed is discharged from the feeding-gates, these receptacles being pivotally supported at opposite ends of the beam and designated generally by the numerals 18' and 19'. The weight-beam is made up of two side bars and a transverse bearing-bar 21, extending across the beam centrally thereof, and this bar rests upon the knife-bearings 22, the said knife-bearings being formed on star-shaped blocks held in brackets or standards 24 by one point of the star dropping into a socket 25 therein, while the upper point of the star serves as a knife-edge and engages the notched lug 23. By this star-shaped block I provide a plurality of knife-edges, either one of which may be brought into use by bringing the desired star-point uppermost, the opposite point dropping into the socket formed in the standard.

The pivoted receptacles at the ends of the weight-beam are hung on bearings, the bar of the scale-beam having inwardly-projecting lugs with sockets therein which hold removable pins 28, said pins having knife-edges 29 at their upper ends fitted to V-shaped bearing-pins held by lugs 30, projecting laterally from the pivoted receptacles. These bearing-pins have reduced screw-threaded shanks passing through the lugs and held by nuts 31. The rear pivot-bearings of the receptacles are formed of the conical pins 32, held in socketed lugs 33 at the ends of the rear bar of the beam, which pins fit into conical sockets of the pins 34, which are held in lugs on the rear sides of the receptacles in a manner similar to the front bearing-pins just described. This construction provides a knife-edge bearing for one side of the receptacle, while the bearing for the other side of the same consists of the conical point. By this arrangement of conical bearings and knife-bearings in combination I secure the most perfect results, as the receptacle is not only accurately and sensitively balanced, but is maintained in the desired position in which it is set irrespective of expansion or contraction of the metal or other causes of derangement to which the machine may be subjected—that is to say, the conical point will accurately center the receptacle, prevent lateral displacement, and hold the same accurately, so that the parts thereof will always aline with other parts of the machine, as will hereinafter appear. The knife-edge, together with the conical bearing, insures the sensitive poise of the pivoted part, and should there be slight expansion or contraction of the metal the knife-edge bearing will allow this, while the conical bearing will insure the proper position of the receptacle laterally or with respect to the other parts of the machine. It will be noticed that the male parts of these bearings extend upwardly, while the female portions extend downwardly, and thus accumulation of dust in the bearings is avoided. In order to protect these bearings of the receptacles against damage from any cause, such as carelessness or rough usage, I provide shields consisting of plates 35, curved on the arc of circles struck from the pivot-point, said plates fitting over the upper ends of the bearing-pins with a slight clearance and being carried on shanks 36, which fit into openings in the ends of the beam-bars, being held therein by the set-screw 37, said shanks having shoulders 38 to accurately determine the position of the shields with respect to the upper ends of the bearing-pins.

The weight of the scale-beam is shown at 39, and this is carried by a movable frame 40, so as to depend therefrom, the frame being made up of side plates between which grooved rollers are journaled, so as to run upon and between upper and lower track-rods 41, which are fixed in the upturned ends of brackets 42, projecting forwardly from the front face of the front bar of the scale-beam. The upper edge of the lower track-bar which bears the weight is in the same plane with the knife-edge bearings. These track-bars extend on each side of the pivotal center of the scale-beam, and the weight, with its rolling supporting-bracket, is free to shift from one side to the other of said center, according as the beam is tipped under the action of the weight of the material which has been deposited in one or the other of the receptacles through its controlling-gate.

Figure 1:
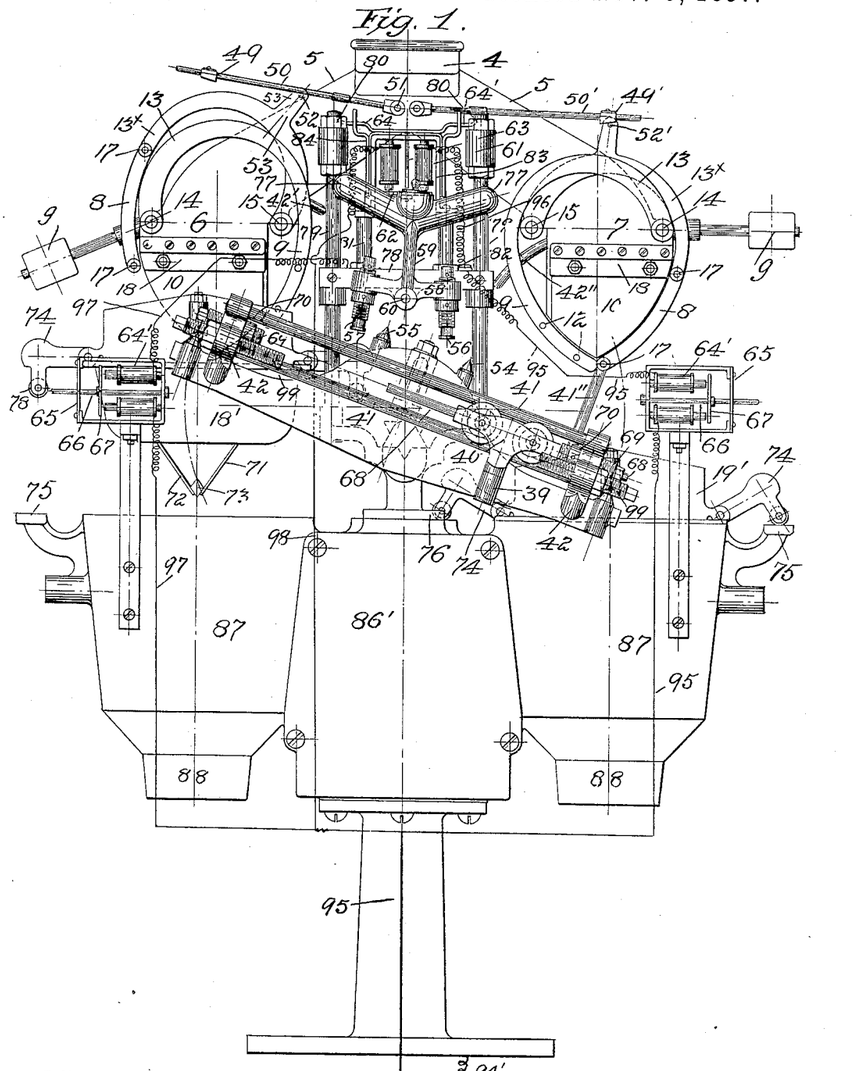
Figure 1 is a front view of the machine, the scale-beam being tipped to the right and showing the right-hand feeding device closed, while the left-hand feed device is fully opened to fill the left-hand receptacle on the scale-beam.
Figure 3:
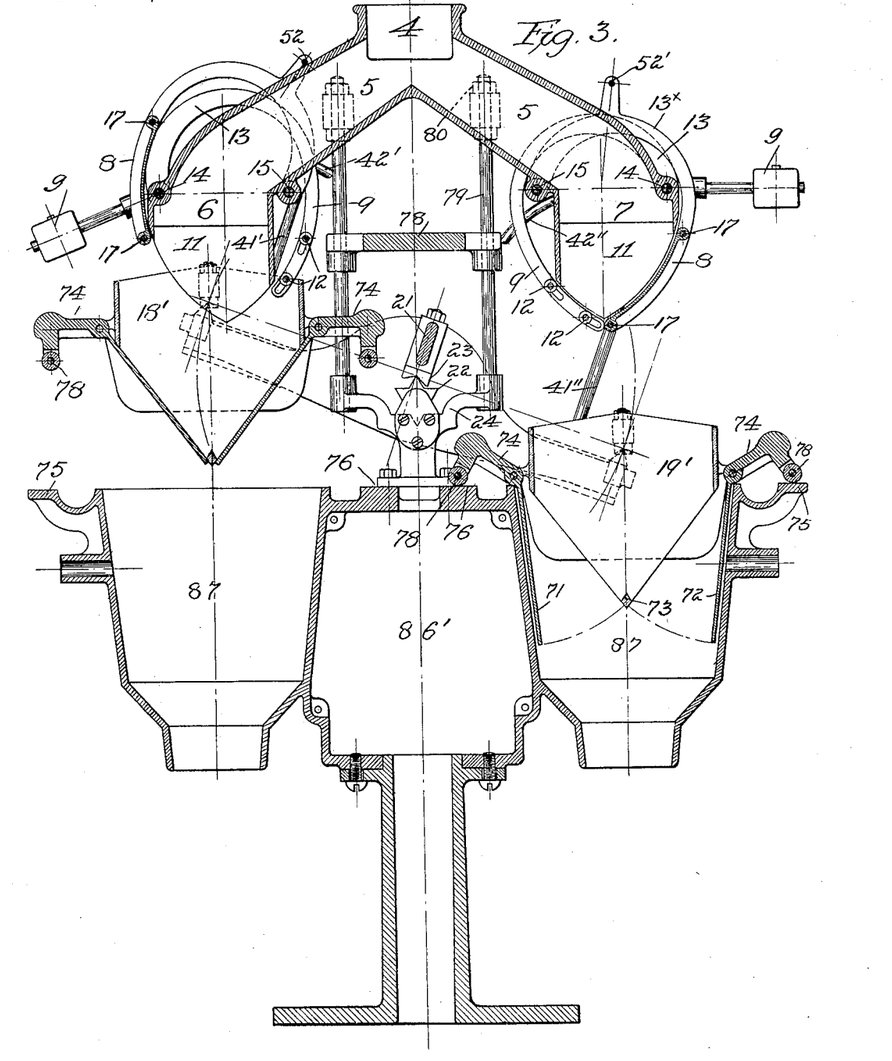
Fig. 3 is a vertical sectional view of the machine from side to side with the parts in the position of Fig. 1.

In the position of the parts shown in Figs. 1 and 3 the beam is tipped to the right and the weight is at the extreme right-hand end of the track-frame. The feeding-gates on the left are open and the material is flowing from the left-hand branch or spout 5 and through the open gates into the receptacle 18' at the left, and when the proper amount has been deposited in said receptacle the force of the weight, with its roller-carriage, is overcome and the weight-beam begins to tip to its opposite position. During the time the weight-beam is in the position shown, however, the left-hand gate is maintained in open position for the free flow of the material by a standard 41', extending up from the end of the rear arm of the beam and having a roller at its upper end engaging a curved arm 42', secured to the rock-shaft 14, upon which the gate-arms 13 are fixed. This rock-shaft has a collar 43 fixed thereon, which carries toothed segment 44, meshing with a smaller toothed segment 45, in like manner carried by another collar 46, fixed on the rock-shaft 15, which carries the arms of the other gate of this pair of gates, so that the two gates of each pair are geared together, and so long as the roller of the standard 41' engages the curved arm 42' both gates of the left-hand pair will be held open and the material will flow freely into the left-hand receptacle. As the beam approaches a horizontal position by reason of the weight of the material in the receptacle overcoming the force of the weight on the beam this standard releases the gate-arm and allows the gates under the action of gravity to make a partial closing movement, so that the gates will partially close and thus reduce the feeding-opening. This closing movement, however, is arrested by a catch-block 49, adjustably fixed on an arm 50, pivoted to the front of the cast feeding-head at 51, Fig. 1, said catch-block being in the path of a cross-pin 52, carried by arms 53, projecting upwardly from the gate-arms 13×, and when said pin engages the catch-block both gates of the left-hand pair are held open, so that the feed will continue, but in reduced quantity. The feeding-opening in this its final form is reduced to the smallest possible size consistent with the free passage of the material to be weighed without choking. This action takes place a little before the proper weight of material has been deposited in the left-hand receptacle, and consequently before the scale-beam reaches a horizontal or perfectly-balanced position. When this balanced position is reached, however, the electrical controlling devices are actuated and the feed is stopped quickly and an accurate weight of material is given, its delivery into the receptacle on the scale-beam having now been effected. It is important that when the beam arrives at its horizontal position, or its position of balance, the feeding-gates be closed instantly, and, further, that the inertia of the weight be overcome and the balance of the beam be destroyed, so that it will tip to the other side. For this purpose it is necessary to employ an outside force, so that the shifting weight will be sent quickly to the opposite side of the center of gravity, and I prefer to use electricity and devices operated thereby for effecting this purpose.

The scale-beam itself is utilized to determine when the electrical controlling devices will be actuated, and for this purpose it carries a pair of contact-points 54 55, of cone form, which are set in sockets in the front arm of the scale-beam, and as the beam reaches its horizontal or poised position the contact 54 at the right of the center touches a contact 56, projecting down from one of the lateral arms 58 of a switch 59, pivoted at 60, so that the circuit is closed between the battery and the electromagnets 61, and when these are energized they draw up the armature 62, which, through the vertical rod 63 and the laterally-extending and upturned arm 64, raises the pivoted arm 50, with its catch-block 49, thus freeing the cross-pin 52 and the gate-arms, thus allowing the gates to close fully under the action of gravitation, both gates of the left-hand pair moving together simultaneously, as they are geared, as before described, to move in unison. The partial closing of the feed-gates as the scale-beam approaches its horizontal or balanced position is of material importance, as by this the amount of the material being fed is reduced by reducing the size of the feed-opening, and the weight of the falling column of material is also reduced, so that the continued movement of the beam to and past its balanced position will depend entirely upon the accurate quantity of material fed into the receptacle and the scale-beam will not be liable to be forced or given an undue impetus due to the fall of a full column of material, as such action would cause an underweight to be given. The series of independently-sliding fingers 12' also play an important part in the action of the feed device, as by them I am enabled to stop the feed instantly. For instance, if both feed-plates were solid a grain of coffee might be caught between them at one side, and by preventing them from closing together an opening would be left at the other side through which the material might continue to fall after the full amount had passed, but with the sliding fingers acting independently if a grain is caught at one point it will be held by the finger at this point, while the other fingers will close and shut off the feed at all other points where no grains have been caught.

In order to destroy the equilibrium of the beam when it reaches a balanced position, I employ devices to act instantaneously upon the weight to overcome its inertia and to start it from one side to the other of the center of gravity, and for this I provide kicking devices, which are designed to act when the scale-beam reaches a horizontal position, said devices being located at the opposite ends of the scale-beam and consisting of electromagnets 64', carried in brackets 65, projecting from the lower frame of the machine, said brackets guiding also the rods 66, which carry the armatures 67. The inner ends of these rods are headed, and when the beam assumes a horizontal position the electric circuit from the battery is closed through the points 54 56 or 55 and 57, as will be hereinafter described, and the electromagnets will be energized, moving the rod by means of the armature inwardly, and thus causing the headed end of the rod to strike violently against the end of the rod 68, projecting from the end of the weighted roller-frame, so that the roller-frame, with the weight, will be given a quick start toward the opposite end of the beam, and this action will insure the tipping of the beam to its opposite inclined position. The projecting rods 68 of the roller-frame project through openings in bushings 69, threaded through the upturned ends of the brackets 42, and these bushings carry clamping-nuts 70, so that the bushings may be set and clamped to adjust the movement of the weight-frame. Adjustable screw-rods 99 are used for balancing the beam, by which the beam and its attached parts may be balanced. This kicking mechanism is duplicated, that at one side of the machine being exactly the same as that at the other side.

Figure 2:
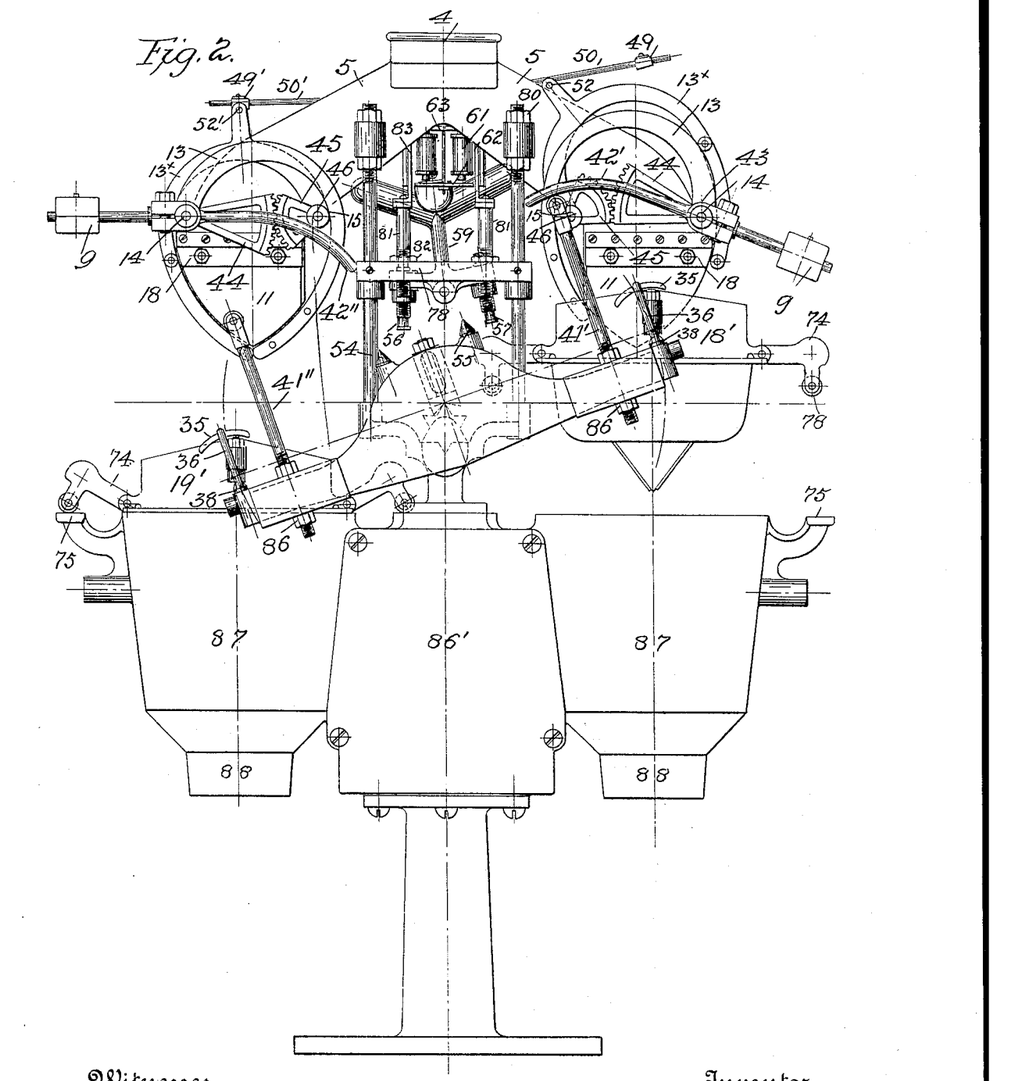
Fig. 2 is a rear view of the machine with the parts in the same position as shown in Fig. 1.

The receptacles, which are pivotally carried at the ends of the scale-beam, always maintain their horizontal position by reason of said pivotal connection, and when either has received its full weight of material it is automatically discharged of its contents when the beam completes its tipping movement to that side. For this purpose the receptacles are provided with hinged walls 71 72 at their outer and inner sides, these walls inclining toward each other and resting at their lower ends against a cross-piece 73, diamond shape in cross-section, so as to present a sharp upper edge which will offer no obstruction to the free downward flow of the material when the side walls are open. These sides are opened automatically by the lateral extensions 74 thereof coming in contact with the surfaces 75 76 on the base-frame, antifriction-rollers 78 being provided in the lateral extensions to make the movement easy, and this action takes place when the beam completes its movement in either direction, as shown, for instance, in Figs. 1, 2, and 4.

The receptacle and gates at one side of the machine are exact duplicates of those at the other side, and the action goes on continuously, the gates at one side being opened when the gates on the other side have been fully closed and the beam is tipping in that direction—that is, toward the side of the gate just closed. For instance, as the beam tips to the left in Figs. 1 and 2, viewing from the front of the machine, and reaches a certain angle of inclination the roller of the standard 41'' at the rear right-hand end of the beam will strike the curved arm 42'' of the right-hand-gate mechanism and will thus open the right-hand gates to begin feeding into the right-hand receptacle, and as the left-hand receptacle is discharging the gates at the right are fully opened and are feeding the maximum flow of material into the right-hand receptacle. The opening movement of the gates at the right moves the cross-pins 52' thereof inwardly behind the right-hand catch-block 49', fixed adjustably on a pivoted arm 50', similar to the parts 49 and 50 before described, so that said pin will be caught and held by said catch when the right-hand gates have partially closed owing to the removal of the standard and roller 41' from 42' as the beam tips back again to right, which it will do when the left-hand receptacle is discharged and the right-hand receptacle has been filled enough to overcome the force of the weight on the beam. As the beam reaches its horizontal or poised position in swinging back to the right, the right-hand gate being held partly open, the same action takes place as before described in connection with the left-hand part of the machine—that is to say, the contact-point 55 touches the contact 57 of the swinging switch, closes the circuit to the electromagnets 61, which will draw up the armature 62, and thus through the arm 64', similar to the arm 64 before described, lift the pivoted arm 50', and thus allow the right-hand gates to close under the action of gravitation.

The switch 59, it will be seen, is pivoted at its lower end, and at its upper end it has laterally-extending hollow arms 77, inclining upwardly and away from each other. These hollow arms or pockets contain mercury, which is free to move from one to the other. In making contact, therefore, the point 54 or 55, as the case may be, not only touches its corresponding contact on the switch, but tilts the switch sufficiently to cause the mercury to flow from one side of the center of gravity to the other, thus causing the said switch to shift from one extreme inclined position to the other and set itself in proper position for making contact with the other contact-point on the scale-beam when said beam tips in the opposite direction. By this tilting contact piece or switch, it will be seen, an alternate action is secured, so as to make contact between only one set of contact-points at a time and in alternation. This swinging contact-carrier is pivoted on a cross-plate 78, fixed to four rods 79, extending up from the posts or standards before described, which hold the knife-bearings of the scale-beam, and these rods at their upper ends are threaded and extend through lugs projecting from the spout-casing or feeding-head, nuts 80 being provided to firmly clamp the parts. This feeding-head, with its spouts and gate devices, may thus be adjusted up and down, so that the discharge-mouths of the gate may be raised or lowered with respect to the receptacles.

The cross-plate 78 has screw-threaded posts 81, fixed therein by nuts 82, and these posts at their upper ends support a frame 83, which in turn supports the electromagnets and guide the armature-carrying rod. To this frame brackets 84 are secured, which have forked upper ends for guiding the arms which control the gate-catches.

The standards 41' 41" for opening the gates are secured adjustably in the ends of the rear arm of the scale-beam, said ends being slotted at 85 to receive the lower threaded ends of the standards, which are secured by the nuts 86.

The base-frame of the machine consists of a casting 86', having lateral extensions 87 in the form of chutes or hoppers under the pivoted receptacles of the scale-beam, said chutes receiving the material discharged from said receptacles and directing the same to any suitable receiver. The lower ends of the chutes have discharge-spouts 88, and the bag or receiver may fit about these. The pivoted receptacles when in their lower or discharging position enter the chutes, as shown in Fig. 3, and the pivoted sides of the receptacles when open fit against the inner sides of the chutes. It will be seen, further, that when the receptacle is in its upper position the lower end of the gate mechanism enters the same, and the machine is so designed that these parts are brought close together, the material having only a short distance to fall from the gates to the receptacles, and thus avoiding the weight of a long falling column of material, which would tend to give the beam an undue impetus and send it past its balancing-point before the proper weight of material had passed into the receptacle. Further than this, arranging the feed devices and the receptacles close together prevents the loss of grains which would result from spilling.

Figure 4:
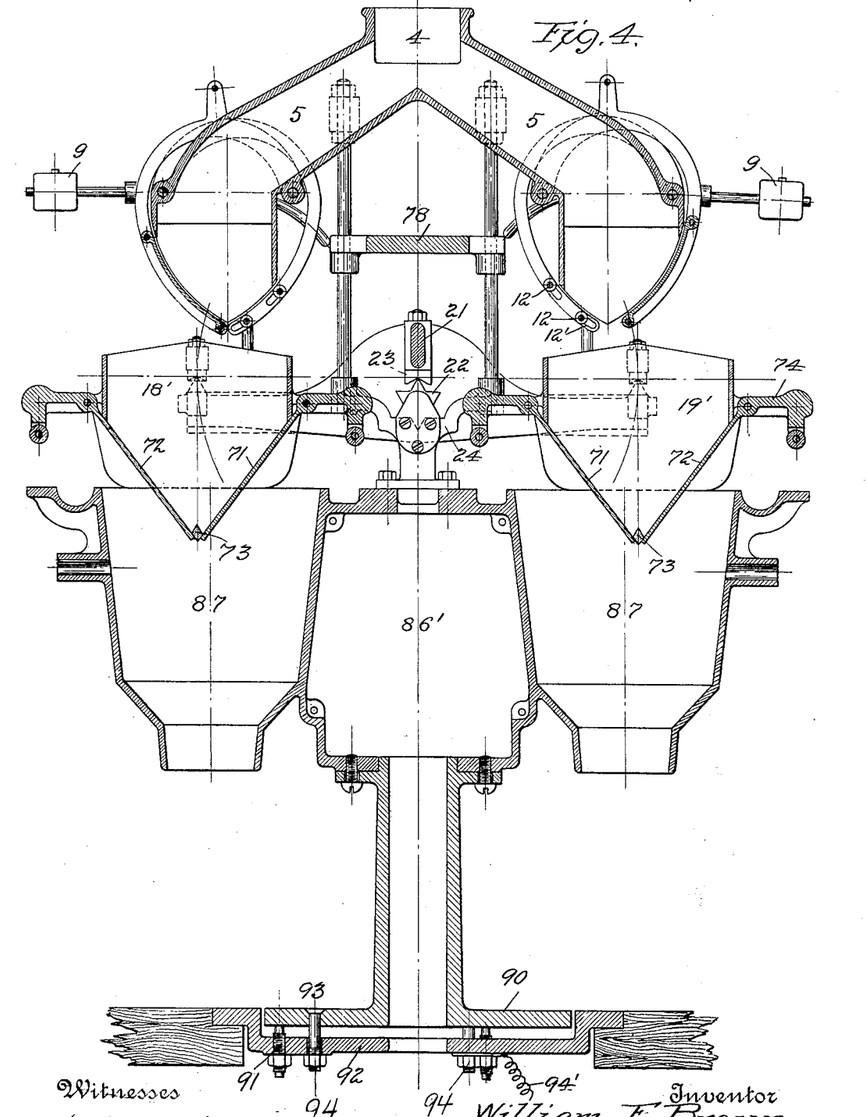
Fig. 4 is a view similar to Fig. 3 with the beam in its balanced position and swinging to the right, showing the parts just before they assume the position shown in Figs. 1, 2, and 3—that is, in Fig. 4 the right-hand feeding device has not fully closed and is still feeding the material, though in reduced quantity, while the left-hand feeding device has not commenced to open, and therefore the right-hand receptacle is receiving the material and is falling, while the left-hand receptacle is rising.
Figure 5:
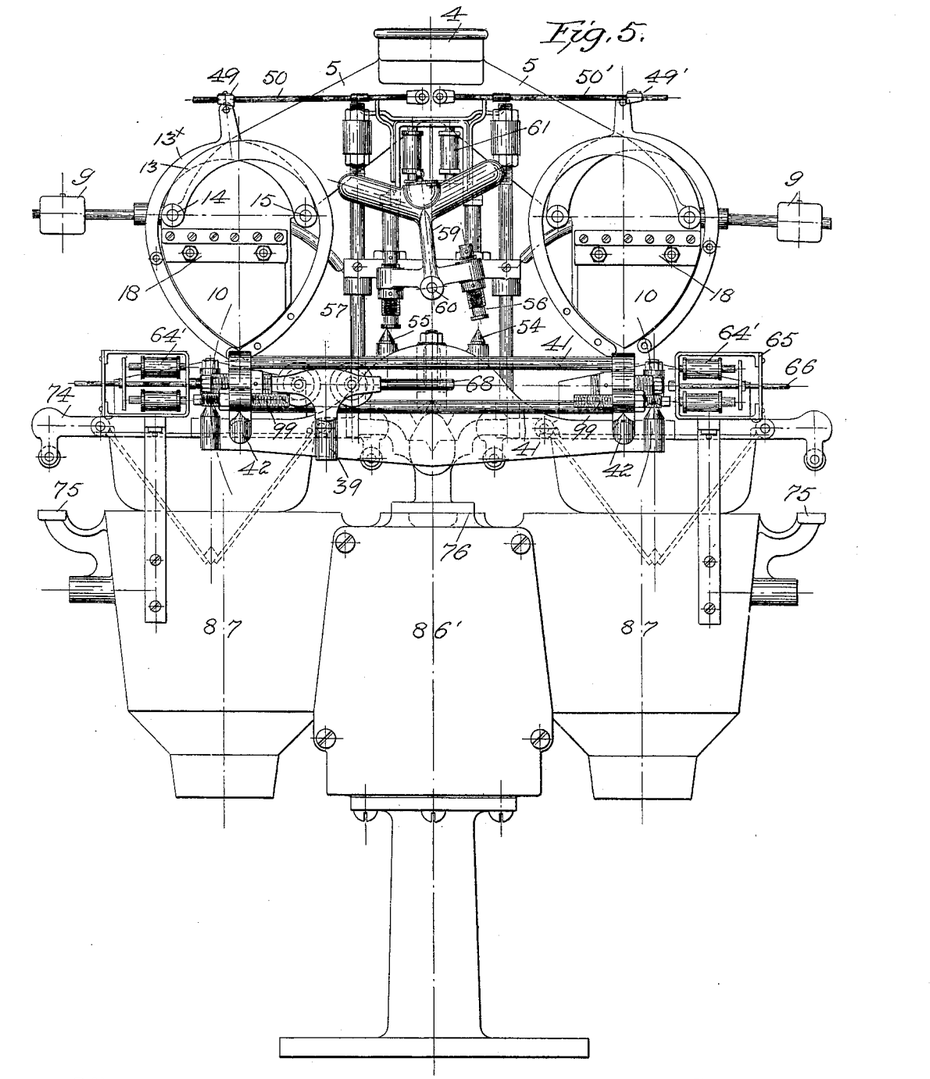
Fig. 5 is a front view similar to Fig. 1 with the beam swinging to the right and with the parts in the same position as in Fig. 4—that is, before they assume the position of Figs. 1, 2, and 3.
Figure 6:
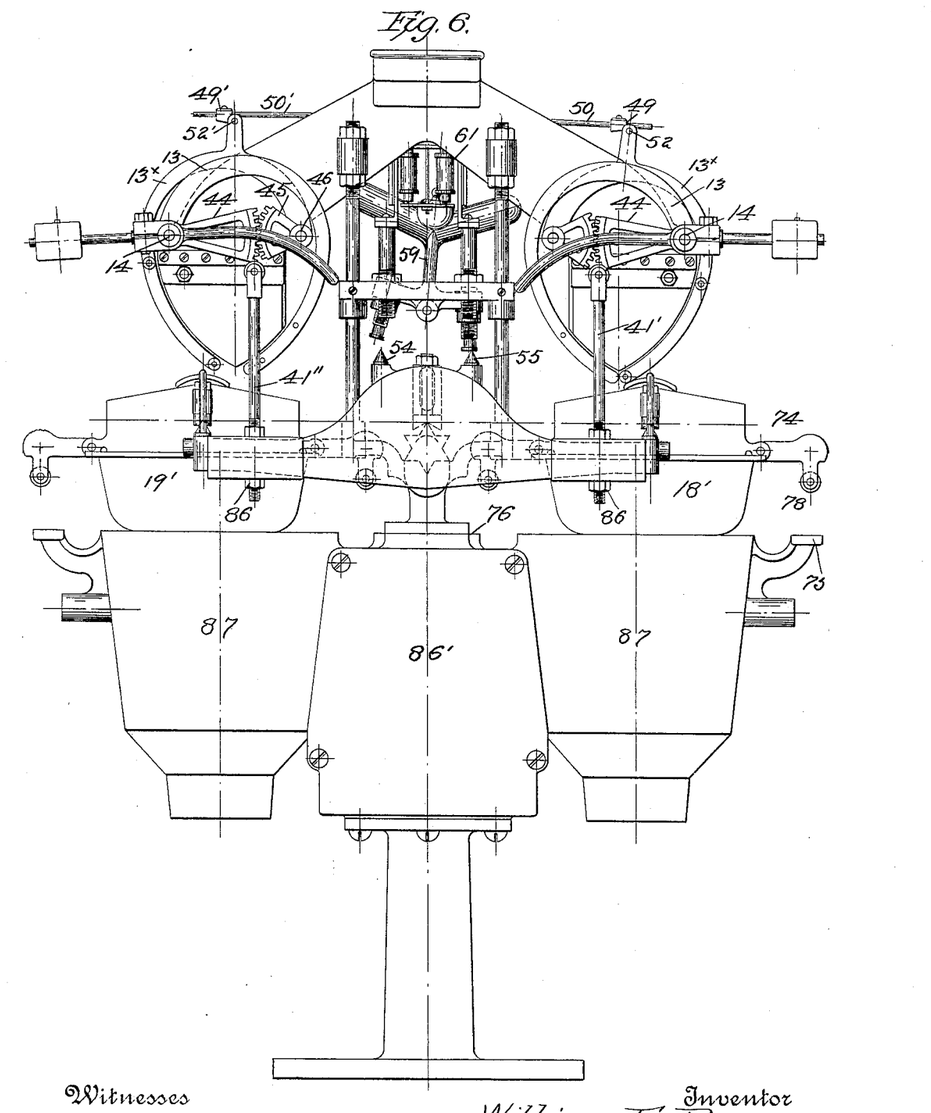
Fig. 6 is a rear view of the machine with the parts in the position of Fig. 5.
Figure 7:
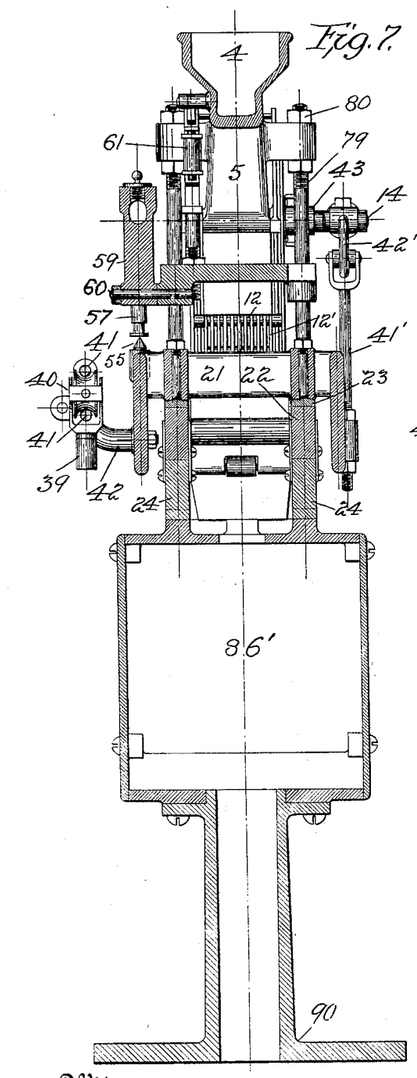
Fig. 7 is a central vertical section in a plane extending from front to rear of the machine.
Figure 8:
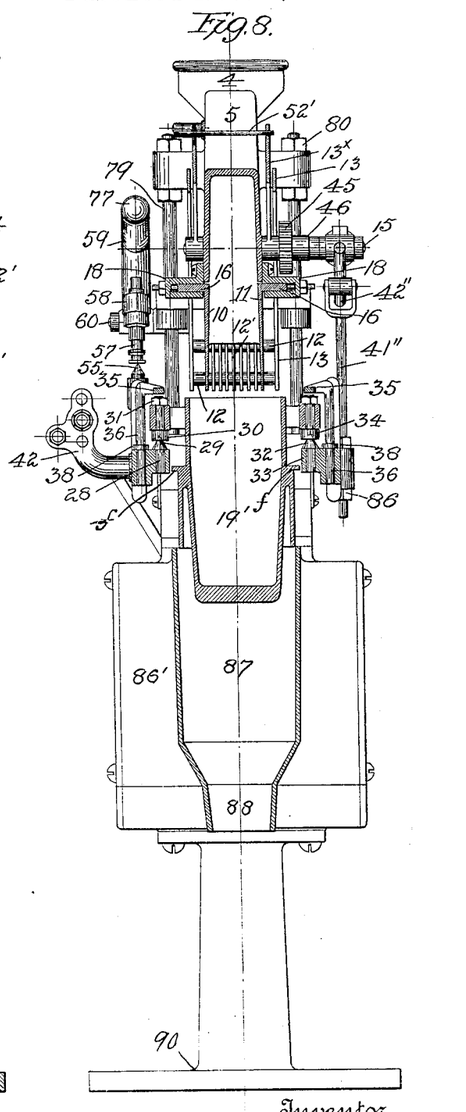
Fig. 8 is a vertical section from front to rear of the machine through the right-hand feeding device and the right-hand receptacle and hopper.
Figure 9:
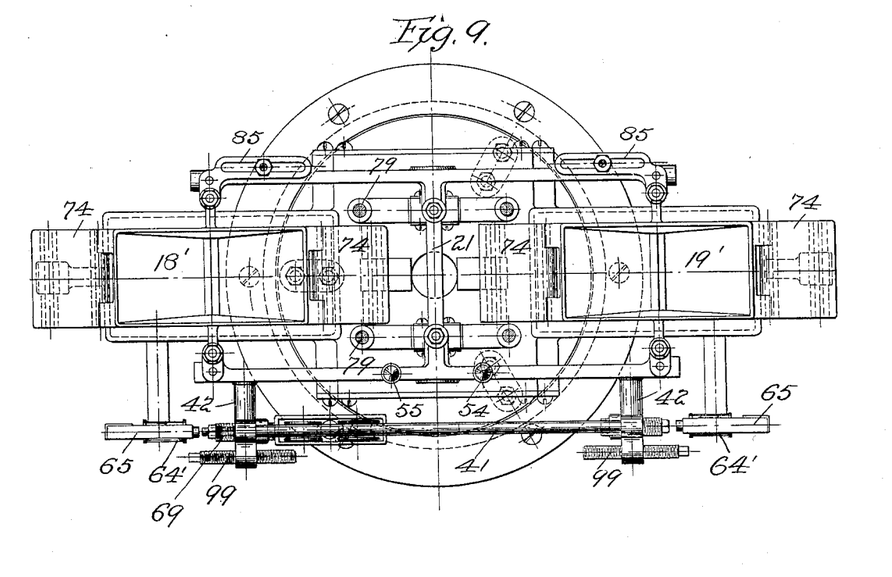
Fig. 9 is a plan view of the scale-beam with its receptacle and part of the base-frame.
Figure 10:
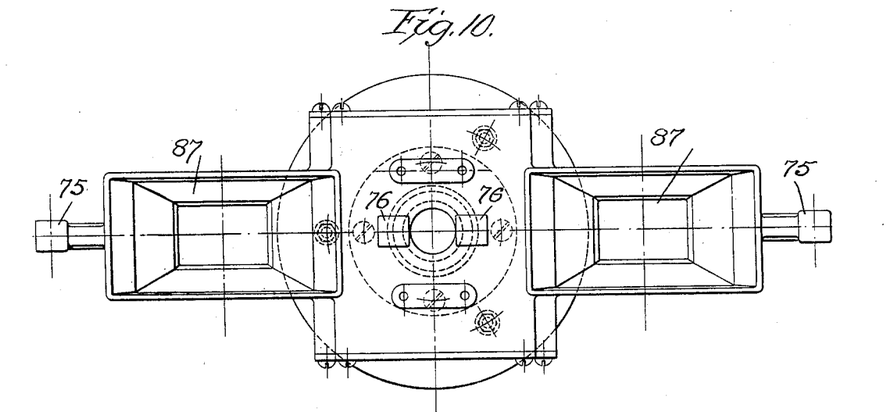
Fig. 10 is a plan view of the base-frame.
Figures 11, 12, 13, 14, 15:
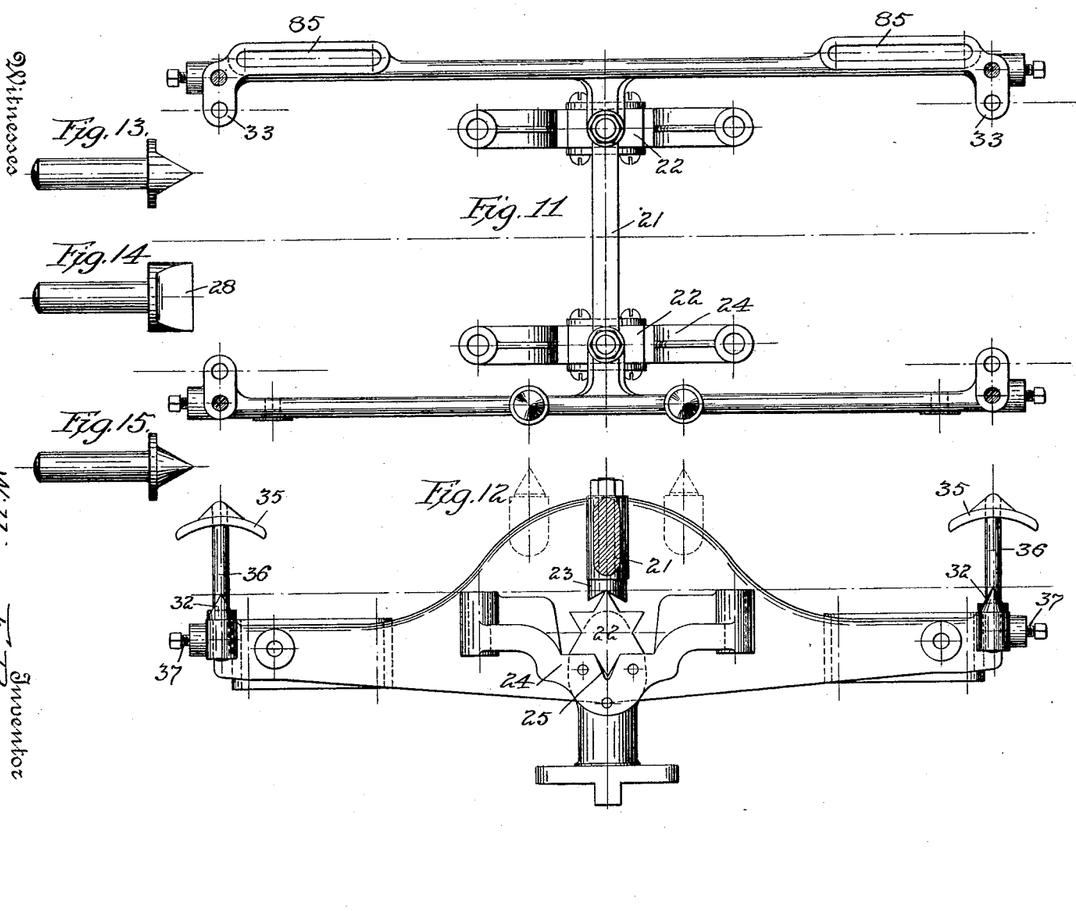
Fig. 11 is a detail plan view of the scale-beam.
Fig. 12 is a sectional view longitudinally of the same.
Figs. 13 to 15 are details of the bearings.
Figure 16:
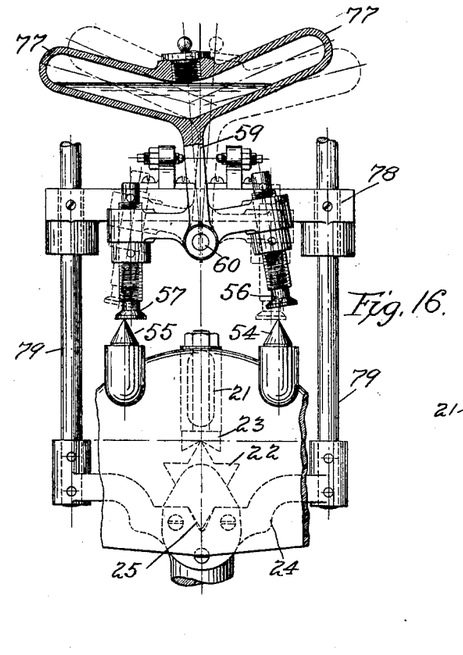
Fig. 16 is a detail front view, partly in section, of the make-and-break device of the electrical connections.
Figure 17:
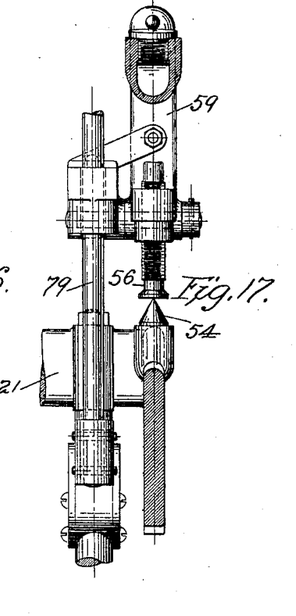
Fig. 17 is a side view of Fig. 16, with parts in section.

In order to secure the full force of gravitation and to accurately adjust the main standard 90, which holds the base-casting accurately in vertical position, whereby proper poise of the various parts is secured, I have provided means for adjusting said standard, consisting of set-screws 91, extending up through a base-plate 92 to bear on the under side of the flange of the standard, as shown in Fig. 4, and clamping-screws 93, having heads countersunk in said flange, extending down therefrom through the base-plate and having their lower ends threaded to receive nuts 94 on the under sides of the said base-plate.

The electrical connections are shown in Fig. 1, in which the main standard is connected with one pole of the battery by the wire 94', and electrical connection is made through the main base-casting, the bearing-posts, and bearings of the scale-beam with the points 54 and 55. The shifting contact-piece is connected with the other pole of the battery through its pivot, the cross-plate, which is insulated from its four supporting-rods, and the wire 95, said wire including in its circuit the electromagnets of the kicking mechanism at the right of the machine. A branch wire 96 connects the cross-plate and the upper electromagnets, while another branch 97 connects the said plate with the electromagnets of the left-hand kicker mechanism, and these, together with the upper magnets, are connected with the wire 95 through the wires 97 and 98, respectively. The weight 39 is connected to the roller-frame by a screw-threaded pin and socket and may be removed and replaced by a larger or smaller weight.

Figure 18:
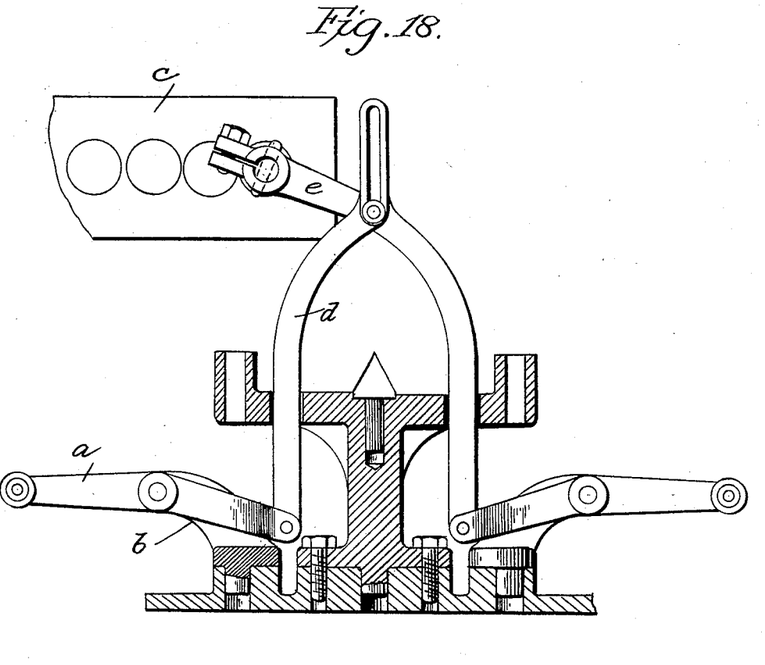
Fig. 18 is a detail view of an indicator mechanism and connections thereto.

I employ with my machine an indicator adapted to show the total amount weighed out, and this I arrange to be operated by the movement of the weight-beam. For this purpose I pivot a lever $a$ on a bracket $b$, supported on the base portion of the machine, said lever having an inwardly-extending roller adapted to be struck by the weight-beam, and thus to be moved, which movement is transmitted to the indicator mechanism at $c$ through the link $d$ and the lever $e$, the bearing-posts of the pivot-bearings having openings for the passage of the links. In my double-acting machine I employ a link and lever to act with each end of the weight-beam, and said links are slotted at their upper ends, so that either one can be operated without affecting the other, the said slots receiving a pin from the indicator-lever.

I effect a closing of the hopper entirely by the receptacle, which has lateral flanges $f$ for this purpose. This closing action takes place when the receptacle moves downwardly after receiving its full complement of material and is to prevent the escaping of any dust or fine particles of the material from the hopper. These flanges prevent the escape of dust from the hopper during the discharging operation. Weights $g$ are used, balancing the weight of the gates.

I claim—

1. In combination in an automatic weighing-machine, a scale-beam adapted to have free and unobstructed movement to its balanced position having a pan or receptacle thereon, feeding means for the same, means actuated by a power outside of the impetus of the beam for destroying the equilibrium of the same when it reaches a balanced position, and means also actuated by an outside power for shutting off the feed at the moment the balance of the beam is reached, said destroying action taking place independent of any movement of the beam from its balanced position or of any displacement of the pan or its contents relative to the beam, the said outside power and actuating means being controlled entirely independent of the impetus of the beam and without requiring the expenditure of any power on the part of the beam, substantially as described.

2. In combination in an automatic weighing-machine, a scale-beam adapted to have free and unobstructed movement to its balanced position having a rolling weight thereon, a pan or receptacle also on the scale-beam, feeding means for the same, means actuated by a power outside of the impetus of the beam for coacting with the weight to destroy the equilibrium of the beam when it reaches a balanced position, and means also actuated by an outside power for shutting off the feed at the moment the balance of the beam is reached, said destroying action taking place independently of any displacement of the pan or its contents relative to the beam, the said outside power and actuating means being controlled entirely independent of the impetus of the beam and without requiring the expenditure of any power on the part of the beam, substantially as described.

3. In combination in an automatic weighing-machine a scale-beam, a non-tilting pan carried by the beam, an electric device for destroying the balance of the beam when it reaches a state of equilibrium independent of the displacement of the pan or its contents relative to the beam, a source of supply, an electric device for cutting off the same at the instant the equilibrium of the beam is reached, and the electric contact on the beam for controlling both actions and making them simultaneous, the said beam having free and unobstructed movement to its balanced position whereby the contact will be made only when the weighing is completed, substantially as described.

4. In combination in a double-acting weighing-machine, a beam, a rolling weight thereon, the scale-pan at each end of the beam, the electric devices one at each end of the beam for coacting with the weight to destroy the balance of the beam and to cause the weight to roll to the opposite end of the beam, a source of supply, and an electric device to cut off the supply at the instant the beam reaches its balanced position, and an electric contact carried by the beam to control the electric devices and to insure their simultaneous operation, said contact acting when the weighing is completed, substantially as described.

5. In combination in an automatic weighing-machine, a beam, a receptacle carried thereby, a source of supply, a device for cutting off the supply, a catch for holding said device partially closed, means independent of the beam for releasing the catch to control the complete operation of the shut-off device, said means being arranged to act when the beam reaches a predetermined position, substantially as described.

6. In combination in an automatic weighing apparatus, a beam, a receptacle carried thereby, a source of supply, a feeding device controlling the same, mechanical means controlled by the beam for controlling the partial closing of the feeding device as said beam approaches a predetermined position, catches for holding the feeding device in partially-closed position and an electric device for operating the catches and controlling the complete closing of the feeding device, said electric device being in turn controlled by the movement of the beam, substantially as described.

7. In combination in an automatic weighing-machine, a beam, a receptacle carried thereby, a source of supply, a feeding device controlling the same, mechanical means carried by the beam for mechanically controlling the partial closing of the feeding device, an electric device controlling the complete closing of the feeding device and an electric device for destroying the equilibrium of the beam, said beam carrying a contact to close an electric circuit when the beam reaches a predetermined position, substantially as described.

8. In combination, the beam, the receptacle carried thereby, the feeding device consisting of a movable gate, means moving with the beam for opening said gate and for controlling the partial closing of the gate, a catch for holding the gate in its partially-closed position and means for controlling the said catch comprising an electromagnet and armature with connections to the catch and a circuit-closer controlled by the movement of the beam, substantially as described.

9. In combination, the beam, the receptacle carried thereby, the movable gate for controlling the feed, said gate having an arm connected therewith, a standard on the beam for opening and controlling the partial closing of the said feed-gate as the beam approaches a horizontal position, a catch for holding the gate in its partially-closed position, a pivoted arm carrying said catch, an electromagnet and its armature, means connected with said armature for operating the pivoted arm and a circuit-closer controlled by the movement of the beam, substantially as described.

10. In combination, the beam, the receptacle carried thereby and a feeding device comprising a pair of pivoted gates arranged to close by gravity, the connection between them consisting of the segments meshing with each other, one of said segments having an arm connected therewith, and means carried by the scale-beam for holding the said arm against the closing tendency of the gates, substantially as described.

11. In combination with a weighing or like machine, a receptacle, and a feeding device comprising a gate having a series of sliding fingers extending from side to side thereof at the point of discharge, substantially as described.

12. In combination in a weighing or like machine, a receptacle, and a feeding device comprising a pair of gates one of which has a rigid jaw or plate and the other of which has a series of sliding fingers, substantially as described.

13. In combination in a weighing or like machine, a receptacle and a feeding device comprising a pair of gates converging toward each other at their lower ends, the curved arms carrying said gates extending past each other and pivoted to the frame, and means for operating the gates, said gates having a lifting movement in opening, substantially as described.

14. In combination in a weighing or like machine, a receptacle and feeding means comprising a pair of feeding-gates connected to move in unison, a weight connected to said gates for counterbalance, a scale-beam having means for opening said gate and controlling the partial closing of the same, and a catch adapted to hold the gates in their partially-closed position with means for operating the same to control the complete closing of the gates, substantially as described.

15. In combination in a weighing-machine, a scale-beam and a pivot-bearing therefor comprising a bearing part on the beam a block having a plurality of bearing-points, and a socket on the frame for receiving one of said points while the other one acts as the bearing for the beam, said block being symmetrical and reversible.

16. In combination in a weighing-machine, a scale-beam and a pivot-bearing therefor consisting of the reversible star-shaped piece, and a socket for holding said piece removably by receiving one of its points while the other point acts as the bearing, substantially as described.

17. In a weighing-machine, pivot-bearings for the movable parts, having a conical point and socket forming the bearing on one side of the beam and the knife-edge and notched piece forming the bearing on the other.

18. In combination, in a double-acting weighing-machine, a scale-beam having a receptacle at each end, a feeding device for each receptacle, means for each end of the beam for destroying the balance of the beam and means controlling the action of said feeding devices and balance-destroying means arranged to make those for one end of the beam act alternately with those for the other end, substantially as described.

19. In combination, in a double-acting weighing-machine, a scale-beam having a receptacle at each end, a weight arranged to shift from one side of the center of gravity to the other, the electromagnets with their armatures located at the opposite ends of the beam for giving the weight an impetus toward the other end of the beam when it reaches a balanced position, a feeding device for each receptacle of the beam and the electric device for closing the said feeding device, substantially as described.

20. In combination, in a double-acting weighing-machine, a scale-beam, a receptacle at each end thereof, carried thereby, a feeding device for each receptacle, means carried at each end of the beam for opening the feeding devices alternately, a catch for each feeding device to hold the same partly open, and the electric device for operating the catches when the beam reaches a balanced position in either direction to allow said feeding devices to close alternately, substantially as described.

21. In combination, the beam with its receptacles, the pair of feeding devices, the catches controlling the closing of the same, the pivoted rods carrying the catches, the electromagnet, the armature thereof having connection with the pivoted rods and means for closing the circuit when the beam reaches a predetermined position, substantially as described.

22. In combination, the beam with its receptacles, the feeding devices, one for each end of the scale-beam, the electrical devices for controlling the feeding devices and means for closing the circuit thereto alternately, comprising the contacts on the scale-beam, and the shifting contact-piece having contacts to be engaged by the contacts on the beam to close the circuit and to be shifted to its opposite position.

23. In combination with the scale-beam having a receptacle at each end, with electrical devices arranged to act alternately at opposite ends of the beam, the contacts on the beam and the shifting contact-piece having points to close the circuit and adapted to be shifted by the movement of the beam.

24. In combination, the scale-beam, the shifting weight having projections at each end, the kicking devices at the ends of the beam and the adjustable bushings through which the projections pass, said bushings acting as stops for the weight-carriage.

25. In combination, the hoppers, the scale-beam, the receptacle pivoted thereon and adapted to fit the hopper, and the flange on the receptacle for closing the hopper, substantially as described.

In witness whereof I have hereunto set my hand in presence of two witnesses.

WILLIAM F. BRAUN.

Witnesses:
HENRY FORNOFF,
WALTER DONALDSON.